(12) United States Patent
Algreatly

(10) Patent No.: US 9,727,138 B2
(45) Date of Patent: Aug. 8, 2017

(54) NANOTECHNOLOGY CLOTHING FOR HUMAN-COMPUTER INTERACTION

(71) Applicant: Cherif Atia Algreatly, Fremont, CA (US)

(72) Inventor: Cherif Atia Algreatly, Fremont, CA (US)

(73) Assignee: CHERIF ALGREATLY, Palo Alto, CA (US)

( * ) Notice: Subject to any disclaimer, the term of this patent is extended or adjusted under 35 U.S.C. 154(b) by 0 days.

(21) Appl. No.: 14/923,461

(22) Filed: Oct. 27, 2015

(65) Prior Publication Data

US 2016/0147303 A1  May 26, 2016

Related U.S. Application Data

(60) Provisional application No. 62/122,689, filed on Oct. 27, 2014.

(51) Int. Cl.
*G06F 3/01* (2006.01)
*B82Y 15/00* (2011.01)

(52) U.S. Cl.
CPC ............. *G06F 3/014* (2013.01); *G06F 3/017* (2013.01); *B82Y 15/00* (2013.01); *Y10S 977/953* (2013.01); *Y10S 977/961* (2013.01)

(58) Field of Classification Search
CPC ......... G06F 3/014; G06F 3/017; B82Y 15/00; Y10S 977/953; Y10S 977/961
See application file for complete search history.

(56) References Cited

U.S. PATENT DOCUMENTS

| | | | | | |
|---|---|---|---|---|---|
| 5,897,694 | A | * | 4/1999 | Woolf | C09D 11/36 106/31.27 |
| 6,128,004 | A | * | 10/2000 | McDowall | G06F 3/014 345/156 |
| 2005/0231471 | A1 | * | 10/2005 | Mallard | G06F 3/014 345/156 |
| 2011/0269544 | A1 | * | 11/2011 | Daniel | A63F 13/06 463/37 |
| 2012/0157263 | A1 | * | 6/2012 | Sivak | G06F 3/014 482/4 |
| 2015/0331493 | A1 | * | 11/2015 | Algreatly | G06F 3/017 345/156 |
| 2016/0085296 | A1 | * | 3/2016 | Mo | G06F 3/033 345/156 |

* cited by examiner

*Primary Examiner* — Tom Sheng

(57) ABSTRACT

The present invention discloses nanotechnology clothing in the form of a glove, shirt, pants or suit that can be worn to track the motion of different parts of a user's body. This tracking is utilized to provide the computer system with an immediate input representing an interaction with a computer application or a 3D simulation of the user's body motion. The present invention is used with computers, mobile phones, and head-mounted computer displays serving a variety of gaming, entertainment, sports and medical applications.

20 Claims, 5 Drawing Sheets

NANOTECHNOLOGY CLOTHING FOR HUMAN-COMPUTER INTERACTION

CROSS-REFERENCE TO RELATED APPLICATION

This application claims the benefits of a U.S. Provisional Patent Application No. 62/122,689, filed Oct. 27, 2014.

BACKGROUND

Piezoelectricity is a well-known effect in which stretching or compressing a material causes it to generate an electrical voltage, or the reverse, in which an applied voltage causes it to expand or contract. Studies prove that using a few atomic thicknesses of two-dimensional materials, such as molybdenum disulfide, opens the potential for new types of mechanically controlled electronic devices. A single layer of atoms could create nanotechnology clothing in the form of wearable devices, which is optically transparent, extremely light, and very bendable and stretchable during use. The study was supported by the U.S. Department of Energy (DOE), Office of Basic Energy Sciences (BES) (No. DE-FG02-07ER46394) and U.S. National Science Foundation (DMR-1122594).

Scientists envision that nanotechnology clothing could change the way humans interact with computers, mobile phones, and optical head-mounted displays. For example, using nanotechnology clothing shaped as a computer glove may eliminate the need for traditional computer input devices such as touchscreen, keyboards, or gesture tracking cameras. Also, utilizing nanotechnology clothing as a wearable suit could track the motion of its users, eliminating the need for traditional motion tracking techniques. This includes optical tracking systems that utilize tracking cameras, and magnetic tracking systems that use magnetic sensors.

Until now there has been no single method or system that utilizes nanotechnology clothing to achieve the aforementioned goals or objectives. Investing in nanotechnology clothing as wearable computer input devices will change the way we interact with computers, mobile phones, and optical head-mounted displays. Consequently, productivity and communication can be dramatically improved.

SUMMARY

The present invention discloses a wearable nanotechnology clothing for human-computer interaction. In one embodiment, the present invention is in the form of wearable gloves that capture the motion of a user's hand or fingers and provide the computer system with an immediate computer input representing an interaction with a computer application. Thus, the user can interact with computers, mobile phones, tablets, or optical head-mounted displays without using a keyboard, touchscreen, or tracking camera to capture the motion of the user's hands.

In another embodiment, the present invention is in the form of a suit that can worn by a user to track the motion of the user's body. This serves broad computer applications in many fields including entertainment, gaming, sports, medical and robotics. For example, in filmmaking, the present invention can be used to record actions of human actors and transpose that information to create animated digital character models in three-dimensions. In game development, the present invention can manipulate the three-dimensional movement of a virtual character or avatar on a computer display to simulate the user's body motion in martial art moves, sport, or other gaming actions. In medical applications, the present invention can be used to track the motion of patients during rehabilitation and present a simulation of their motion on a computer display for tracking and medical analysis purposes.

Generally, one of the main advantages of the present invention is that the user's motion is accurately captured regardless of the user's location or light exposure. For example, the present invention can capture the user's motion while they are swimming or diving underwater. Also, the present invention can capture the user's motion in darkness, indoors or outdoors, whilst they sleep, walk, or perform different activities. The tracked data of the user's body is wirelessly sent, in real-time, to an electronic device such as a computer, tablet or mobile phone, or stored for later transfer to a computer. This data allows a simulation of the shape and motion of the user's body, potentially serving various computer applications.

Overall, the above Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
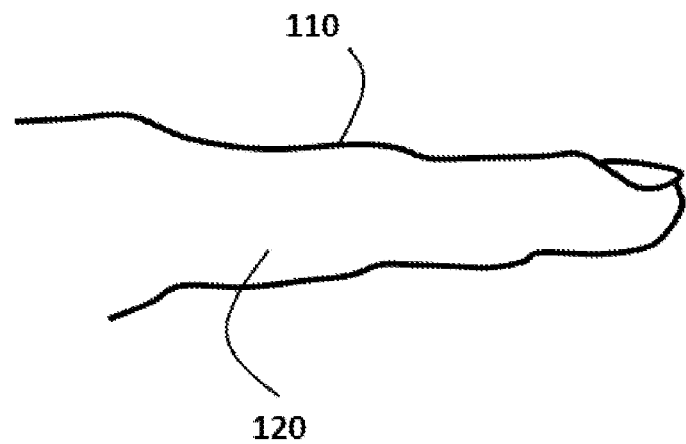
FIGS. 1 and 2 illustrate a first configuration of the present invention to track the motion of a user's finger.
Figure 2:
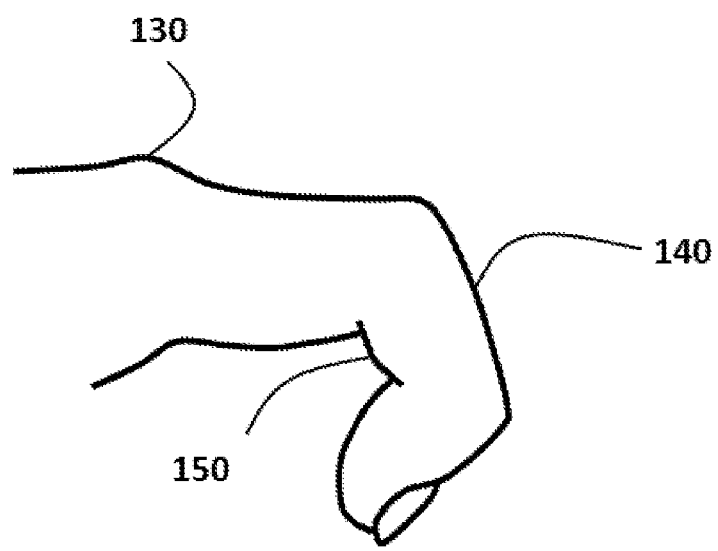

According to one embodiment of the present invention, FIG. 1 illustrates a first configuration of an atomically thin material 110 of molybdenum disulfide ($MoS_2$) which is shaped to be worn on a user's finger 120. As known in the art, this atomically thin material is optically transparent, extremely light, and very bendable and stretchable. FIG. 2 illustrates bending the finger 130, by rotating its joints, to simultaneously stretch the atomically thin material on the top side 140 of the finger and compress the atomically thin material on the bottom side 150 of the finger. The stretching of the atomically thin material happens because of the stretching of the skin on the top side of the finger, when the finger is bent. Also, the compression of the atomically thin material happens because of the compression of the skin on the bottom side of the finger, when the finger is bent.

A tension force is applied to the stretched area of the atomically thin material and a compression force is applied to the compressed area of the atomically thin material when the finger is bent. At this moment, as known in the art, positive and negative polarized charges are squeezed from each single layer of atoms as it is being stretched. The magnitude of the positive and negative polarized charges represents the extent of stretching and compressing of the atomically thin material, which also represents the degree of the finger bending or the rotational angles of the finger joints.

Sensing each unique magnitude of the positive and negative polarized charges and capturing the picture of the finger bending at the moment of each unique magnitude allows us to interact with computers in an intuitive manner. This is achieved by creating a database that associates each unique magnitude of the positive and negative polarized charges accompanying a unique finger bending. Each unique finger bending is also associated with a computer input which is provided to the computer system once the finger is bent. When bending the finger, the magnitude of the positive and negative polarized charges is sensed by a polarizing sensor, and the database is checked against the magnitude to determine the finger bend associated with this magnitude. Once the finger bend is determined, a computer input associated with the finger bending is provided to the computer system to allow the user to interact with a computer application presented on the computer display.

According to the above description, in one embodiment, the present invention discloses a computer input method comprising: sensing each unique magnitude of the positive and negative polarized charges generated on an atomically thin material attached to a finger; associating each unique magnitude with a corresponding finger bend; associating the corresponding finger bending with a computer input to be provided to a computer system once each unique magnitude is sensed.

Using the present invention with a single finger allows providing a number of different computer inputs to the computer system. Using the present invention with all ten hand fingers allows a large number of different computer inputs to the computer system. In this case, the present invention comes in the form of two gloves that can be worn on a user's hands to detect the motion of the user's ten fingers. In one embodiment, the computer input provided by the present invention represents letters, numbers or signs, which replaces using a computer keyboard or a virtual keyboard on a touchscreen. In this case, the user can type by moving their hands in the air without using a desk or surface to support the hands during typing. This allows the user to type while they are walking, lying supine, or away from the computer.

In another embodiment, each unique computer input provided by the present invention represents invoking a program command to perform a certain action on the computer display, similar to the functions of MICROSOFT OFFICE keyboard shortcuts, GOOGLE CHROME keyboard shortcuts or the like. In yet another embodiment, the computer input provided by the present invention represents an interaction with a graphical user interface of a GPS or Radio of a car. This allows the user to use the GPS or Radio of the car while driving. In also another embodiment, the computer input provided by the present invention represents an interaction with a game application presented on a digital display. This replaces the need for using a game controller or keyboard to interact with various gaming applications.

In one embodiment, the present invention is utilized to facilitate the user's interaction with the digital data presented on an optical head-mounted display. This utilization of the present invention is very valuable since the user of optical head-mounted displays cannot employ traditional computer input devices such as computer mouses, keyboards or touchscreens while standing or walking. Moreover, in such a case, using the present invention removes the need for a tracking camera to capture the motion of the user's hands. Also, this invention removes the necessity for a speech recognition system to interact vocally with the optical head-mounted display. This dramatically improves the user's interaction with modern optical head-mounted displays to serve various gaming, entertainment, and military applications.

Figure 3:
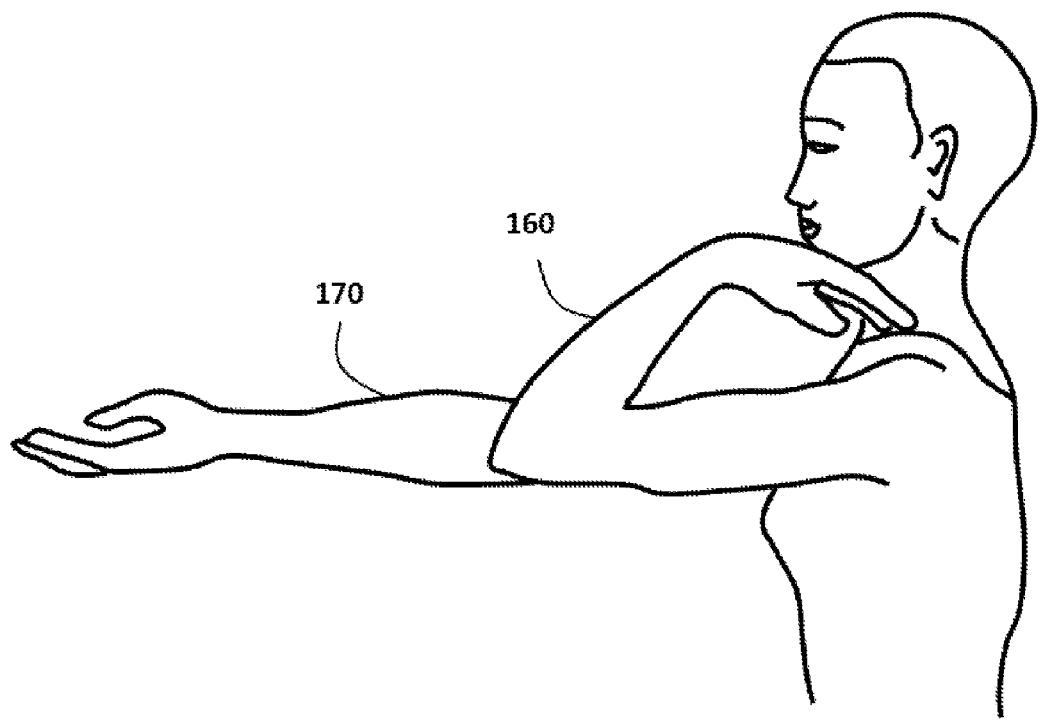
FIG. 3 illustrates a second configuration of the present invention to track the motion of a user's arm.
Figure 4:
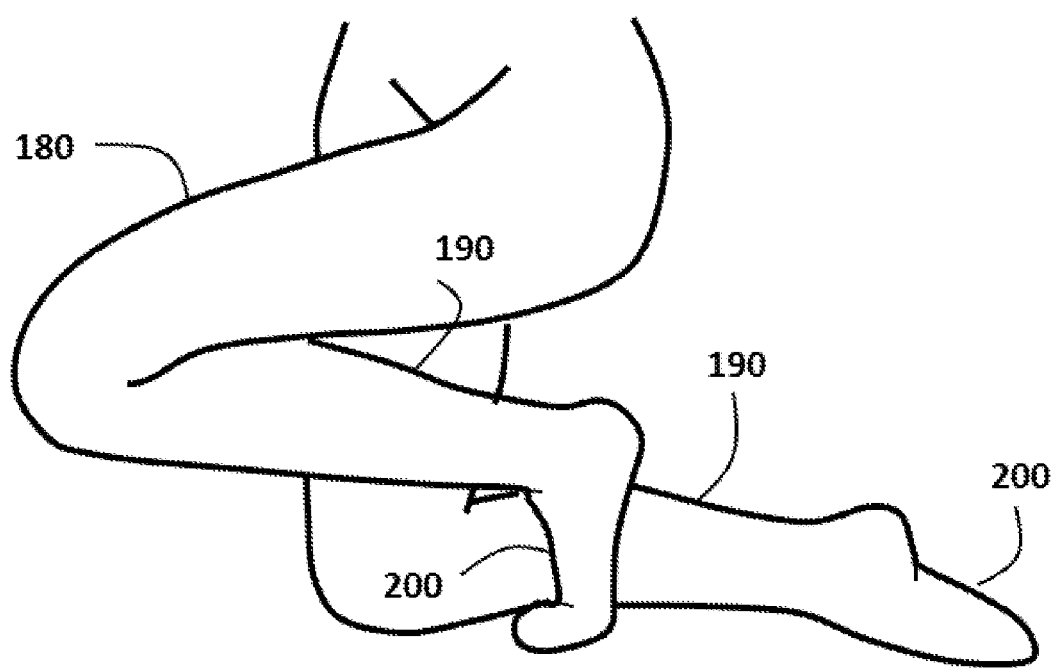
FIG. 4 illustrates a third configuration of the present invention to track the motion of user's leg.

Overall, the same concept of detecting a finger bending motion to interact with a computer can be utilized to sense the motion or the joints rotation of different parts of a human's body. For example, FIG. 3 illustrates using the present invention to detect the joint rotation or motion of a user's forearm. As shown in the figure, the elbow joint of the left forearm 160 was rotated while the right forearm 170 is straightened. Accordingly, the exact motion of the left forearm can be determined to provide the computer system with an immediate computer input representing the forearm rotation. Also, FIG. 4 illustrates using the present invention to cover the thighs 180, legs 190, and feet 200 of a user. As shown in the figure, the rotation of the joints connected to the thigh and leg, or connected to the leg and foot, in addition to the toes joints, can be detected to provide a computer system with an input representing the motion of these parts of the user's body.

Figure 5:
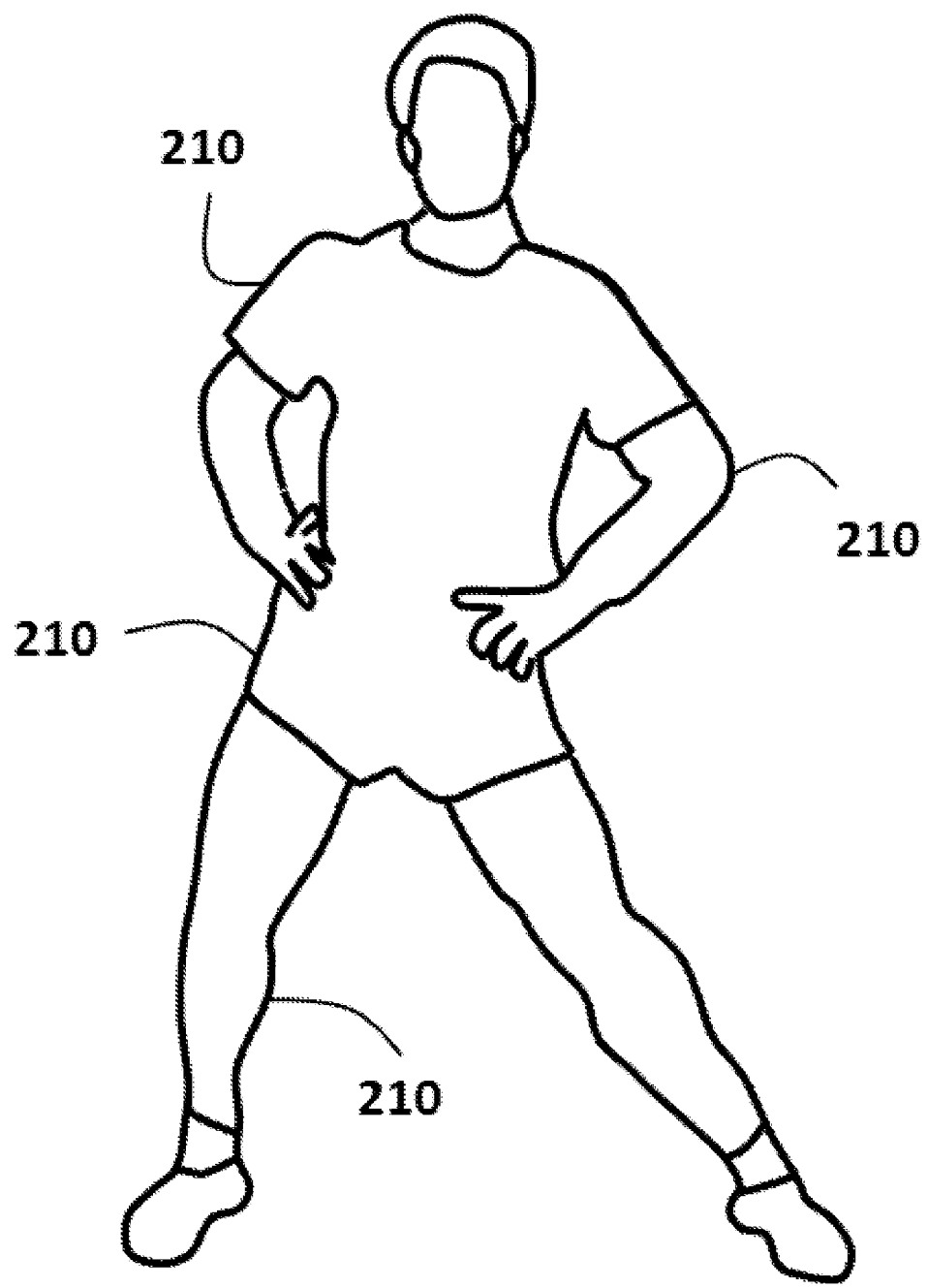
FIG. 5 illustrates a fourth configuration of the present invention to track the motion of the user's body.

FIG. 5 illustrates using the present invention to detect the motion of a user's body. As shown in the figure, the motion or joints rotation of most of the user's body can be detected, including but not limited to, the user's legs, arms and shoulders. The detection of a user's body motion can be utilized in various gaming, filmmaking, and computer applications. For example, the motion detection of a user's hand or fingers in the air or on a surface can be interpreted to provide the computer system with an immediate computer input representing a computer mouse movement, keyboard keystrokes, or touchscreen interaction. In these cases, the user of the present invention will move their hands like they would hold a real computer input device and the detection of the hand or finger's movement provides an immediate computer input to the computer system, replicating the output of a typical computer input device. Thus, the user can easily interact with a computer, tablet, mobile phone, as well as an optical head-mounted display without a computer input device.

The present invention facilitates communication between the computer system and several everyday human tools without additional connections. For example, it is possible for the user of the present invention to employ a regular pen as a computer pen input device. The user can write on a regular piece of paper using a regular pen while the present invention simultaneously detects the user's hand/finger motions and provides immediate text input to the computer system. The present invention can also convert a regular computer display into a touch screen, where the user can move their finger to point at any specific icon or menu on the computer display, and the regular computer display will react as if it were a touchscreen. This is done by detecting the user's hand/finger movements relative to the computer display's position and dimensions to manipulate the icons or menus to interact with the movement of the user's hand/finger.

Moreover, the present invention can provide a warning tool to alert users when they move their body in an awkward position during different activities such as sleeping, working out, or lifting a heavy object that could injure their back or other body parts. This is achieved by detecting the motion of each part of the user's body and comparing this data with a database that associates each risky motion with a warning message to alert the user of their risky motion. The warning message can be in the form of a sound or automated vocal message generated by a mobile phone, or a digital text that appears on the mobile phone display. In this case, the present invention is wirelessly connected to a mobile phone or other electronic devices such as an optical head-mounted display.

Additionally, in 3D movie production techniques, the present invention gives a comprehensive yet inexpensive tool for CG-animation or 3D cartoon movies, making it easy to capture the different motions of the performers and to emulate or copy these motions into a movement for 3D cartoon characters. In sports training and analysis, the present invention is a perfect tool to be utilized in many applications that provide the computer system with data simulating the details of the user's body movements while practicing different sports, such as shooting a basketball into a net, shooting a ball in a soccer game or swimming. The user can view the simulation of all such details on the computer display to recognize their mistakes. Also, collecting the data of the players' motions using the present invention facilitates the analysis of the entire game to locate the team's/individual's mistakes during a game.

The present invention also facilitates remote interactive virtual sporting, where two or more players can participate and compete in games remotely, since detecting each player's motions provide immediate input to the computer that can be connected to the Internet to transfer the action of the player to the others in different locations. This allows for the involvement of several participants from different geographical location.

A main advantage of the present invention is that capturing of the user's movement is accurately achieved regardless of the user's location and the lighting conditions. The tracked data of the user's body is wirelessly sent, in real-time, to an electronic device such as a computer, tablet, or mobile phone, or stored for later transfer to the electronic device. This data simulates the shape and motion of the user's body in three-dimensions on the device display.

Another advantage of the present invention is solving the constraints of traditional recognition methods of hand gestures that utilize digital cameras or depth sensing cameras. The digital camera can be a computer camera that captures images of the user's hand in front of the computer, which is then interpreted by a computer vision program that analyzes the pictures to determine the hand gestures in real time. The depth sensing camera detects the distances between the camera and the hands or fingers and accordingly can determine the hand gestures upon the detected distances. However, as is well known, using a digital camera or depth sensing camera comes with constrains and limitations. For example, the user's hand must directly face the digital camera or depth sensing camera. Additionally, certain tilting or rotation of the user's hand prevents the hand gesture recognition. Thus the user is unable to utilize such techniques while they are moving around the computer or lying supine. Additionally, if there is an object located between the user and the camera, then the process stops until the object is removed. Moreover, minor hand gestures cannot be recognized or detected when using the digital cameras or the depth sensing camera. All such problems regarding the use of digital cameras and depth sensing cameras are solved with the use of the present invention.

As described previously, the present invention discloses nanotechnology clothing to detect the motion or rotation of the different joints of a human's body. In one embodiment, the present invention is comprised of a few atomic thicknesses of two-dimensional materials, such as molybdenum disulfide, shaped in the form of a wearable cloth such as gloves, shirt, pants, or suit. A plurality of sensors is connected to certain spots of the wearable cloth to sense the positive and negative polarized charges. These certain spots are located where the motion or rotation of the body's joints causes stretching or compression of the two-dimensional materials. The sensors are connected to a microprocessor that receives the output of the sensors and wirelessly provides a computer system with an immediate input representing the motion or rotation of the body's joints.

In one embodiment, the immediate input provided by the microprocessor to the computer system is checked against a first database that associates each unique magnitude of positive and negative polarized charges, sensed at a certain spot, with a motion of joint rotation at this certain spot. The value of the rotation corresponds to the magnitude of the positive and negative polarized charges. In another embodiment, a second database is used to associate each joint rotation of the user's body with a command that performs a certain action on the computer display. The certain action can represent a keyboard shortcut, typing a letter or number, or manipulating an object to move in 2D or 3D on the computer display. The object moved on the computer display can be a virtual character or avatar of a gaming application, or a 3D simulation of the user's body.

In one embodiment, the computer system that receives the output of the microprocessor is a computer system of an electronic device such as mobile phone, tablet, computer, or optical head-mounted display. In this case, the microprocessor is wirelessly connected to the electronic device, and the display of the electronic device is used to present the computer application which the user is interacting with. As mentioned previously, the computer application can be a desktop application or Web-based application. Also, as described previously, the present invention can serve as a warning tool to alert users when they move their body in an awkward position, where the computer application generates warning messages in the form of sounds or digital text.

Figure 6:
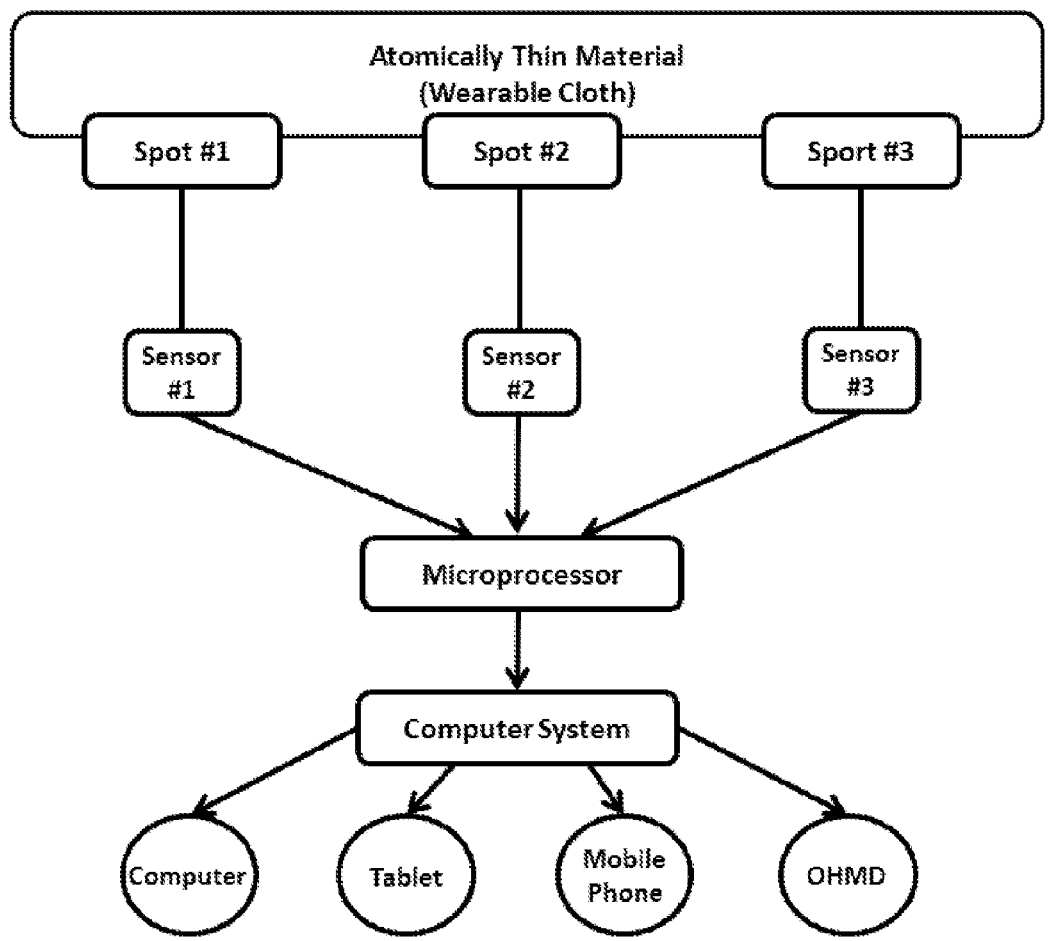
FIG. 6 illustrates a block diagram presenting the main components of the present invention, according to one embodiment.

FIG. 6 illustrates a block diagram presenting the main components of the present invention, according to one embodiment. As shown in the figure, the present invention is comprised of atomically thin material in the form of a wearable cloth, with a plurality of sensors connected to certain spots on the wearable cloth. These certain spots are affected by the rotation of the body's joints to generate positive and negative polarized charges. The sensors sense the magnitudes of the positive and negative polarized charges at each spot and provide this data to a microprocessor. The microprocessor receives the data from the sensors and wirelessly provides a computer system with an immediate computer input representing the motion of different parts of the user's body. The computer system can be a computer system of an electronic device such as computer, tablet, mobile phone, or optical head-mounted display.

It is important to note that $MoS_2$ is just one of a group of 2D semiconducting materials known as transition metal dichalcogenides, all of which have similar piezoelectric properties. However, the atomically thin material can be 'nano-laminating' atomic sheets of different van der Waals (vdW) materials. These vdW building blocks are materials in which the atomic bonds are strong in two directions, but weak in the third. This gives them a layered structure, like a stack of paper, and makes it easy to separate ('exfoliate') the layers. Common vdW materials include graphite, which can be exfoliated to form single sheets (graphene); many high-T superconductors; and layered chalcogenides such as MoS2. Many of these systems already display behavior due to the low dimensionality of their electronic structure. The technique can use re-stacking dissimilar vdW materials in a controlled fashion ('nano-lamination'). Using this technique, it is possible to create heterostructures that are essentially designer materials, with control at the level of the individual atomic layer.

Finally, while a number of exemplary embodiments have been presented in the description of the present invention, it should be understood that a vast number of variations exist, and these exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below. Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

The invention claimed is:

1. A computer input system comprising:
    a wearable textile made of a few atomic thicknesses material to generate positive and negative polarized charges at one or more joints of a user's body when the one or more joints are rotated;
    one or more polarizing sensors to sense the magnitude of the positive and negative polarized charges and generate a signal representing the magnitude;
    a database that associates each unique magnitude with a corresponding rotation of the one or more joints; and
    a microprocessor to receive the signal and check the database to determine the corresponding rotation and provide a computer system with an input representing the corresponding rotation.

2. The computer input system of claim 1 wherein the wearable textile is in the form of a glove.

3. The computer input system of claim 1 wherein the wearable textile is in the form a shirt, pants or suit.

4. The computer input system of claim 1 wherein the one or more polarizing sensors are wirelessly connected to the computer system.

5. The computer input system of claim 1 wherein the few atomic thicknesses material is made of two-dimensional materials such as molybdenum disulfide.

6. The computer input system of claim 1 wherein the input represents a keyboard shortcut, keyboard typing, or interaction with a gaming application.

7. The computer input system of claim 1 wherein the input represents a three-dimensional simulation of the rotation of the one or more joints.

8. The computer input system of claim 1 wherein the microprocessor is wirelessly connected to the computer system of an electronic device.

9. The computer input system of claim 1 wherein the computer system is a computer system of an electronic device.

10. The computer input system of claim 1 wherein the computer system alerts the user when the one or more joints are rotated in inappropriate manner.

11. A computer input method comprising:
    attaching a few atomic thicknesses material to one or more joints of a user's body to generates positive and negative polarized charges when the one or more joints are rotated;
    sensing the magnitude of positive and negative polarized charges;
    checking a database that associates each unique magnitude with a corresponding rotation of the one or more joints; and
    providing a computer system with an input representing the corresponding rotation when the magnitude is sensed.

12. The computer input system of claim 11 wherein the few atomic thicknesses material is made of two-dimensional materials such as molybdenum disulfide.

13. The computer input system of claim 11 wherein the input represents a keyboard shortcut, keyboard typing, or interaction with a gaming application.

14. The computer input system of claim 11 wherein the input represents a three-dimensional simulation of the one or more joints rotation.

15. The computer input system of claim 11 wherein the computer system is a computer system of an electronic device such as a computer, mobile phone, tablet, or optical head-mounted display.

16. A computer input device comprised of:
    a wearable textile made of a few atomic thicknesses material to generate positive and negative polarized charges when one or more joints of the hand's fingers are rotated;
    one or more polarizing sensors to sense the magnitude of the positive and negative polarized charges and generate a signal representing the magnitude;
    a database that associates each unique magnitude with a corresponding rotation of the one or more joints; and
    a microprocessor to receive the signal and search the database to provide a computer system with the computer input representing the corresponding rotation.

17. The computer input device of claim 16 wherein the few atomic thicknesses material is made of two-dimensional materials such as molybdenum disulfide.

18. The computer input device of claim 16 wherein the computer input represents a keyboard shortcut, keyboard typing, or interaction with a gaming application.

19. The computer input device of claim 16 wherein the computer system is a computer system of an electronic device such as a computer, mobile phone, tablet, or optical head-mounted display.

20. The computer input device of claim 16 wherein the wearable textile is a glove.

* * * * *